United States Patent [15] 3,655,914
Gifft et al. [45] Apr. 11, 1972

[54] FACSIMILE SYSTEM

[72] Inventors: Thomas H. Gifft, Anaheim; Francis E. Adams, Corona, both of Calif.

[73] Assignee: T. H. Gifft Co., Inc., Anaheim, Calif.

[22] Filed: June 30, 1969

[21] Appl. No.: 837,546

[52] U.S. Cl. ..........................178/69.5 F, 178/5.6, 307/295, 328/133

[51] Int. Cl. ..........................H04n 1/36

[58] Field of Search ..........................178/69.5 F, 69.5, 6, 5.6, 5.8, 178/6, 50; 325/42; 328/134, 133; 333/18; 179/4; 307/233, 295

[56] References Cited

UNITED STATES PATENTS

| | | | |
|---|---|---|---|
| 2,636,938 | 4/1953 | Hester | 178/69.5 |
| 3,068,318 | 12/1962 | Fischer et al. | 178/69.5 |
| 3,084,213 | 4/1963 | Lemelson | 178/5.6 |
| 3,447,085 | 5/1969 | De Haas et al | 178/69.5 |
| 3,496,287 | 2/1970 | Wheeler | 178/5.6 |
| 3,358,082 | 12/1967 | Helm | 178/50 |
| 3,500,162 | 3/1970 | Dyer | 328/133 |
| 3,555,438 | 1/1971 | Ragsdales | 307/295 |

*Primary Examiner*—Richard Murray
*Assistant Examiner*—P. M. Pecori
*Attorney*—Smyth, Roston & Pavitt

[57] ABSTRACT

The present invention is directed to a facsimile system incorporating a digital filter, which digital filter is used to detect the presence of a start signal and a stop signal in an input signal, which start and stop signals control the starting and stopping of the facsimile system. The digital filter used in the facsimile system of the present invention includes an electronic switch which is switched under the control of a reference signal. An input signal is also applied to the digital filter and the digital filter provides for an output signal when there is a frequency correlation between the reference signal and the input signal. The digital filter provides a very sharp response and does not use impedance elements to determine the tuning of the filter. The impedance elements used in the digital filter only control the time constant of the filter.

13 Claims, 2 Drawing Figures

Patented April 11, 1972

3,655,914

2 Sheets-Sheet 1

Figure 1:
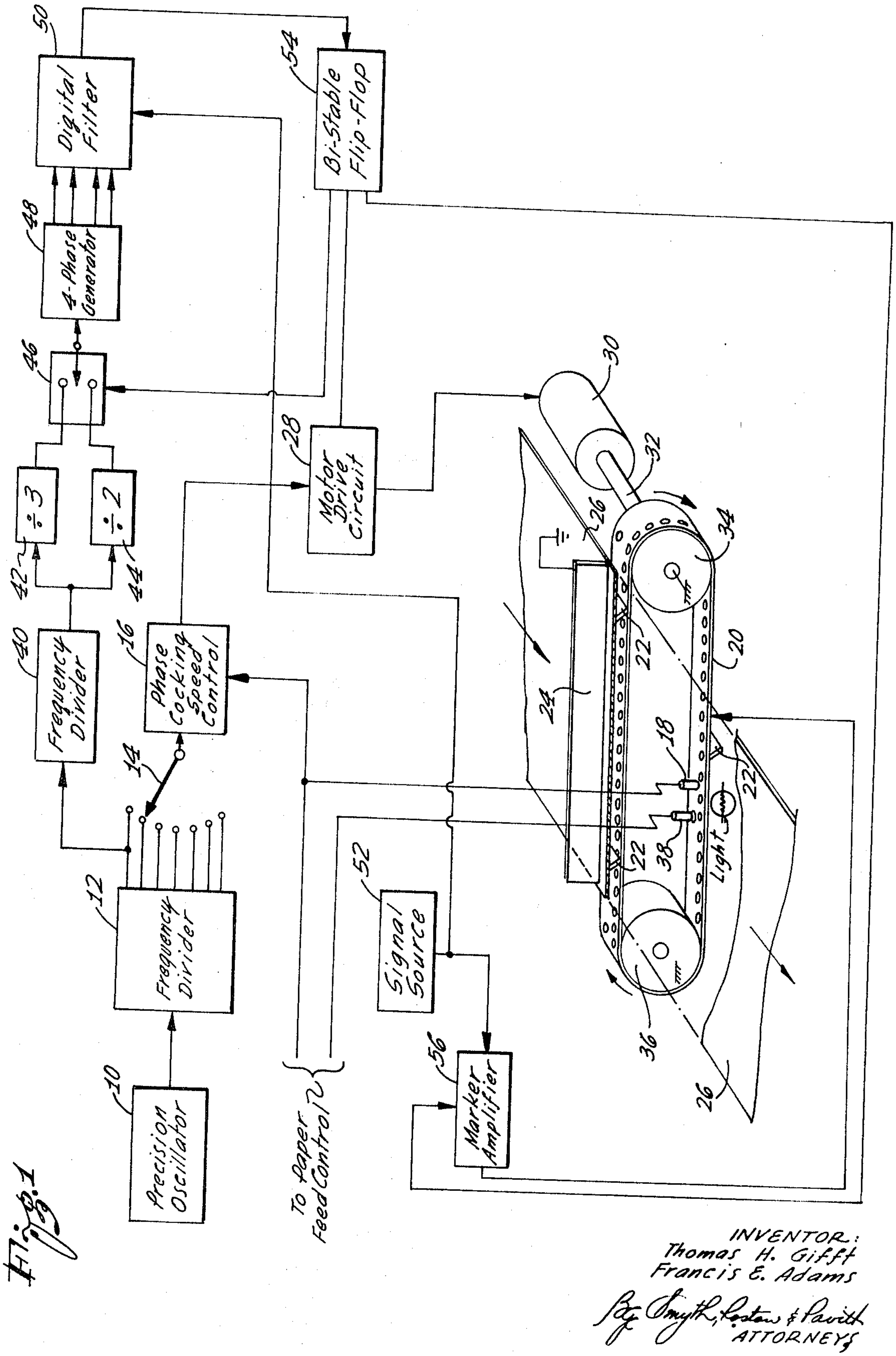

INVENTOR:
Thomas H. Gifft
Francis E. Adams

By Smyth, Roston & Pavitt
ATTORNEYS

Patented April 11, 1972

3,655,914

2 Sheets-Sheet 2

INVENTORS
Thomas H. Gifft
Francis E. Adams

By Smyth, Roston & Pavitt
ATTORNEYS

FACSIMILE SYSTEM

The present invention may be used in a facsimile system of the type shown in U.S. Pat. No. 3,369,250 issued Feb. 13, 1968, listing Thomas H. Gifft as the inventor. Reference is made to the U.S. Pat. No. 3,369,250 for the general details of a facsimile system which may be used with the present invention.

Specifically, the present invention is an improvement in a facsimile system of the type shown in U.S. Pat. No. 3,369,250 and incorporates means for controlling the starting and stopping of the facsimile system in accordance with an external start and stop signal. As an example, facsimile systems of the present invention are used to provide for facsimiles of weather maps, which facsimiles are derived from signals sent out by the World Meterological Organization (WMO). The WMO sends out these facsimile signals in representation of weather maps at periodic times, but there is no specific schedule when signals in representation of weather maps are to be sent out. The WMO, however, announces the sending of signals in representation of a weather map by preceding the information signal with a start signal, which start signal is a 300 cycle per second signal. When all of the information signal relating to a particular weather map is sent out by the WMO, a stop signal, which has a frequency of 450 cycles per second, is sent out to indicate that the information to produce the facsimile of the weather map is complete.

Since it would be impractical to allow the facsimile system to run all of the time, which would incorporate large periods when no information is being received, it is desirable to provide some method of starting and stopping the facsimile system. It is possible, of course, to have an operator monitor the WMO signals and when a 300 cycle per second signal is heard, the operator may start the facsimile system. When the facsimile of the weather map is completed and the 450 cycle per second signal is received, the operator may stop the facsimile system. It is better, however, to provide for such a starting and stopping on an automatic basis.

It is not easy to provide for a filter system to detect a relatively low frequency such as 300 cycles per second, which is the start signal, or 450 cycles per second which is the stop signal, and also have the filter system tunable between the two frequencies. Ordinary filter systems would have to incorporate rather large impedance elements in order to provide for the detection of such low-frequency signals. Also, in order to provide for an accurate detection of the start and stop signals, the impedance elements would have to have rather large Q's, which would, of course, raise the cost of these elements. More importantly than the cost, however, is the fact that it is very difficult to provide for very sharp and reliable detection of low frequencies using ordinary filter elements and to provide for a tuning of such filter elements.

The present invention provides for the detection of such low frequencies to control the turning on and off of the facsimile system, which detection is provided by a digital filter. The digital filter has high stability and is basically simple in construction. The digital filter is all electronic and does not use any mechanical structures for tuning. The filter band is quite sharp and narrow and is very reliable when compared with other methods of filtering. One difficulty with the use of a digital filter is that a stable frequency source must be provided in order to use the digital filter. In the facsimile system of the present invention, the stable frequency source is already present and is used to control various operations in the facsimile system. Therefore, the present invention is relatively simple in that it is not necessary to provide an additional stable frequency source $f$ or use with the digital filter.

The digital filter used with the facsimile system of the present invention incorporates an electronic switch which is switched in accordance with a reference signal. The filter is tuned by the frequency of the reference signal applied to the filter and the impedance elements that are included in the digital filter are only used to control various time constants. Another advantage of the digital filter which is important for use with the facsimile system of the present invention is that it is relatively easy to tune the digital filter to different frequencies, since, as indicated above, the digital filter is tuned by changing the frequency of the reference signal. The present invention, therefore, provides for the use of the digital filter to control the start and stop of a facsimile system where the start and stop of the facsimile system is in accordance with input signals, which input signals include specific start and stop signals which have different frequencies.

As a particular example and as indicated above, the World Meterological Organization sends out a facsimile information signal which includes a signal of 300 cycles per second preceding the information signal as a start signal and which includes a signal of 450 cycles per second subsequent to the information signal as a stop signal. The digital filter is controlled to detect either the 300 cycle per second signal or the 450 cycle per second signal at the appropriate times so as to in turn control the facsimile system to be "on" or "off" at the appropriate times.

Specifically, the present invention includes means for receiving the information signal, including the start and stop signals. This information signal is then applied to a digital filter. The digital filter is supplied with a reference signal which is actually a four-phase signal of the proper frequency from a four-phase generator. The four-phase generator is supplied with either a reference signal of a first frequency or a second frequency in accordance with the position of an electronic switch, which switch controls the input to the four-phase generator. The signals to the switch basically come from a precision oscillator which is already present in the facsimile system of the present invention. When the digital filter detects a correlation between the input signal and the reference signal, an output signal is produced from the digital filter. The output signal from the digital filter is applied to a flip-flop to control the state of the flip-flop. The state of the flip-flop in turn controls various components of the facsimile system to begin to record and provide a facsimile of the information received by the signal source. When the information is completely received so as to provide for the desired facsimile, the signal source receives a stop signal which is in turn detected by the digital filter which controls the state of the flip-flop to stop the various components of the facsimile system.

The state of the flip-flop also controls switching between the two frequencies for the reference signal applied to the digital filter so that the digital filter is always ready to filter the desired frequency. For example, when the stop signal is received, the state of the flip-flop controls the electronic switch so that the reference signal applied to the digital filter is that frequency which correlates to the start frequency. Therefore, when the start signal is next received, the digital filter detects this frequency and controls the flip-flop to turn on the facsimile system. At the same time, the state of the flip-flop controls the electronic switch so that the reference signal applied to the digital filter is that frequency which correlates to the stop frequency. Therefore, the digital filter through the states of the flip-flop controls the reference signal applied to the digital filter to always be at the proper frequency in anticipation of the next start or stop signal.

Figure 2:
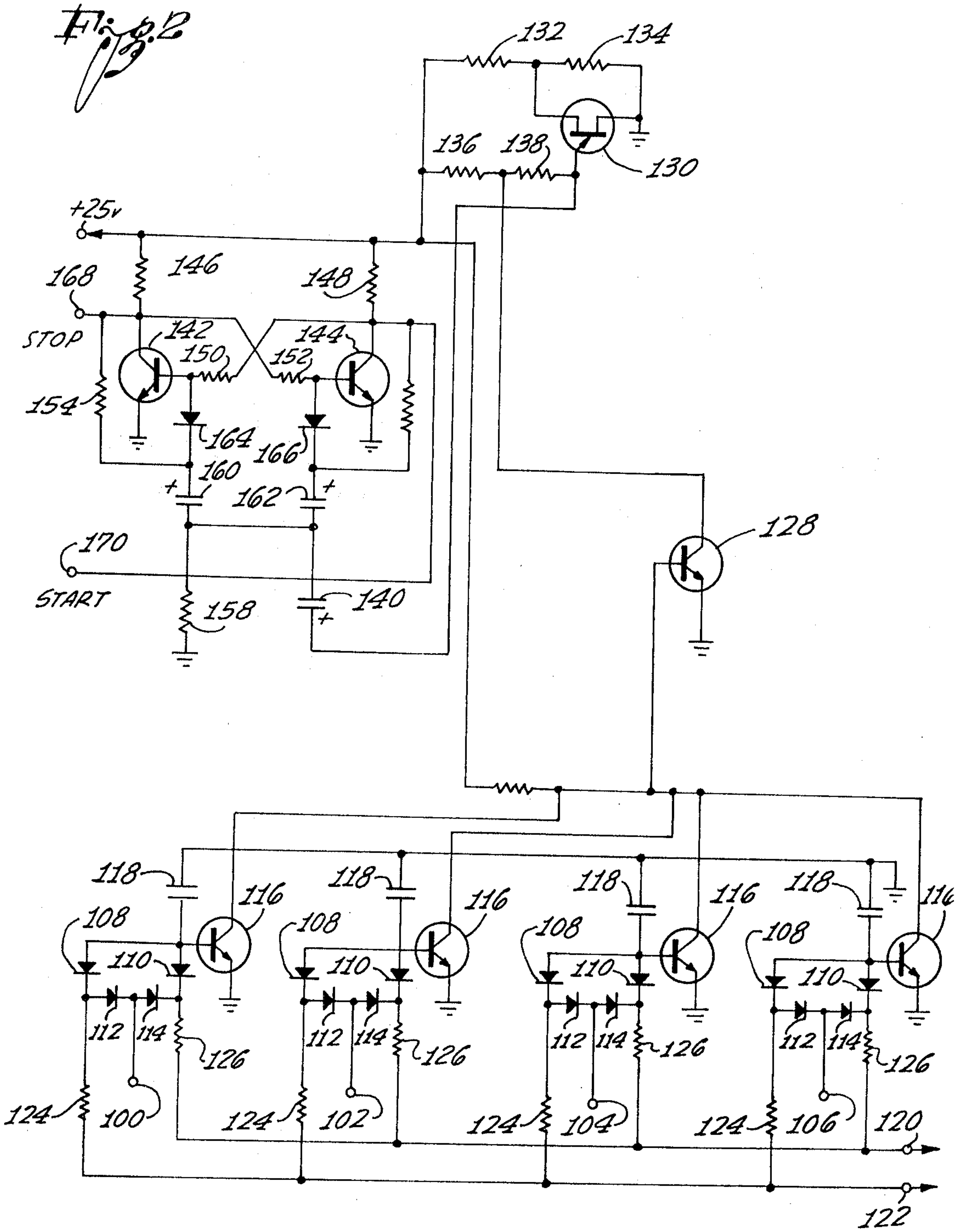

A clearer understanding of the invention will be had with reference to the following description and drawings wherein:

FIG. 1 illustrates in block diagram form a facsimile system of the present invention incorporating a digital filter; and FIG. 2 is a schematic of a digital filter in combination with a flip-flop, which combination is used in the system of FIG. 1.

In FIG. 1, a precision oscillator 10 produces an output signal which is fed to a frequency divider 12. The oscillator may be of a known type, for example, a crystal-controlled oscillator, so as to produce a very precise output signal. The frequency divider is a conventional frequency divider which provides a plurality of outputs each having a different frequency value. Individual ones of the various frequency outputs from the frequency divider 12 may be chosen using a switch 14. The particular frequency chosen is applied to a phase-locking speed control 16 as a first input to the phase-locking speed control 16.

A second input to the phase-locking speed control 16 may be a series of pulses which are produced by a pickup means 18. The pickup means may be a photoelectric cell which produces a series of output pulses in accordance with the speed of a drive band 20. Specifically, the pickup system may include the photoelectric cell which detects particular openings in the drive band 20 and the frequency of the pulses in the output signal from the pickup means 18 is in accordance with the speed of the drive band 20. Reference is made to U.S. Pat. No. 3,369,250 indicated above for further details of the pickup means 18.

The drive band 20 carries a plurality of write heads 22. The write heads 22 are positioned at periodic positions around the drive band 20 so that as soon as one head 22 has completed a scan, a second one of the heads 22 is in position to begin a scan. Specifically, the heads 22 scan across a blade 24 so that when a current signal is applied to the drive band 20 the signal passes through a particular one of the heads 22 and to the blade 24. Positioned between the blade 24 and the head 22 is recording paper such as electro-chemically coated paper 26, which paper produces a visible mark when current flows between the head 22 and the blade 24. Therefore, as the drive band 20 rotates carrying the heads 22 across the paper 26, and each time a current signal is applied to the drive band 20, a visible mark appears on the paper 26. It is, therefore, possible in accordance with the signal applied to the drive band 20 to produce a visible output representation on the paper 26.

It can be seen, therefore, that the switch 14 is positioned to choose the desired frequency signal from the frequency divider 12. This controls the input to the phase-locking speed control 16. The second input to the phase-locking speed control is in accordance with the output from the pickup means 18. Therefore, the output from the phase-locking speed control 16 is applied to a motor drive circuit 28 which in turn controls the speed of a servo motor 30. The servo motor 30 specifically drives the drive band 20 through a shaft 32 which is coupled to a roller mechanism 34. A free roller 36 supports the other end of the drive band 20.

The speed of the drive band 20 is locked to the frequency selected by the position of the switch 14 and a phase-locking speed control 16 may be used to accurately maintain the speed of the drive band 20. The phase-locking speed control 16 may be of the type shown in U.S. Pat. No. 3,176,208 issued Mar. 30, 1965, listing Thomas H. Gifft as the inventor. The use of such a phase-locking speed control precisely servo controls the drive band 20 to the exact desired speed.

A second pickup means 38 may be used to detect the start of each of the write heads 22 as it enters to scan across the paper 26. This pickup may be of the same type shown in U.S. Pat. No. 3,369,250. It is also to be appreciated that the pickup 38 as well as the pickup 18 may be of other types, for example, magnetic pickups may be used in place of optical pickups. The output from the pickup 38, in addition to the output from the pickup 18, may be applied to paper feed controls of the type shown in U.S. Pat. No. 3,369,250, which controls form no part of this invention.

The output of the frequency divider 12 and particularly a fixed one of the outputs of frequency divider 12 may be applied to a second frequency divider 40. As a specific example, the output frequency from the frequency divider 40 may be chosen to have a frequency of 3,600 cycles. The output from the frequency divider 40 is in turn applied to a pair of frequency dividers 42 and 44 in parallel with each other, which frequency dividers 42 and 44 provide respectively outputs of 1,200 and 1,800 cycles per second. These two outputs of 1,200 and 1,800 cycles per second are applied to a switch means 46 and the output of the switch means is coupled to a four-phase generator 48. Depending upon the position of the switch 46, the input to the four-phase generator 48 is either 1,200 or 1,800 cycles per second.

The four-phase generator 48 provides for a four-phase output signal to be applied to a digital filter 50, which four-phase signal is one-fourth of the frequency applied to the four-phase generator 48. Therefore, the four-phase signal applied to the digital filter 50 has frequencies of either 300 or 450 cycles per second in accordance with the position of the switch 46. The frequency dividers, the switch 46 and the four-phase generator 48 may all be of conventional types and the particular circuitry of these devices form no part of the present invention.

In addition to the four-phase reference signal input to the digital filter 50, a line input is applied to the digital filter 50 from a signal source 52. The signal source 52 may be a receiver or some other means of receiving the facsimile signal. For example, as indicated above, the World Meterological Organization sends out a signal which provides for facsimiles of weather maps. Included in the signal such as the signal from the World Meterological Organization are start and stop signals.

In the specific embodiment shown in FIG. 1 wherein the four-phase reference signals applied to the digital filter 50 have frequencies of either 300 or 450 cycles per second, these frequencies correlate to the stop and start signals included in the informational signals provided by organizations such as the World Meterological Organization. For example, the start signal may be a 300 cycle per second signal and the stop signal may be a 450 cycle per second signal. Therefore, the signal source 52 receives a facsimile information signal but prior to the actual information signal a start signal such as a 300 cycle per second signal is received and applied to the digital filter 50. When the signal such as the start signal is received by the digital filter 50 and assuming that the switch 46 is in the proper switch position, the digital filter 50 provides an output signal which controls the state of a flip-flop 54.

The signal from the signal source 52 is also applied to a marker amplifier 56, which amplifier provides a current signal which is applied to the drive band 20 so as to provide for marks on the paper 26 in representation of the information from the signal source 52.

The flip-flop 54 has various control outputs which control the motor drive circuit 28, the switch 46 and the marker amplifier 56. Therefore, assuming the switch 46 is initially in the position to provide a signal of 1,200 cycles per second which in turn provides a four-phase 300 cycle per second reference signal to the digital filter 50, and assuming that the signal source 52 receives a start signal consisting of a 300 cycle per second signal and such signal is also applied to the digital filter 50, the digital filter now produces an output signal which controls the state flip-flop 54. The flip-flop 54 in turn provides output signals to turn on the motor drive circuit 28, to turn on the marker amplifier 56 and to control the switch 46 to be in the position to provide an 1,800 cycle per second signal which in turn provides a 450 cycles per second four-phase signal to the digital filter 50.

The signal source 52 continues to receive the information signal which is applied to the marker amplifier 56. The marker amplifier 56 has been controlled to be on, so the marker amplifier provides current signals to control the production of visible marks on the paper 26. At the end of the informational signal, the signal source 52 provides for a stop signal of 450 cycles per second which is applied to the digital filter 50. Since the state flip-flop 54 had previously controlled the switch 46 to provide for a 450 cycle per second four-phase signal to be applied to the digital filter 50, the digital filter now provides an output signal to again control the flip-flop 54. The state of the flip-flop 54 is changed to produce an output signal to turn off the motor drive circuit 28, to turn off the marker amplifier 56 and once again switch the switch 46 to the position so that a 300 cycle per second four-phase signal is applied to the digital filter 50. The system is now awaiting a new start signal from the signal source 52 which again would turn on the facsimile system so that the facsimile system would be ready to produce a new facsimile of the information received by the signal source 52.

FIG. 2 is a schematic of a digital filter and a flip-flop controlled by the digital filter which may be used in the system of FIG. 1. In FIG. 2, the digital filter consists of four sections which are essentially identical. Each section receives a reference signal of the same frequency but each reference signal is 90° out of phase from the preceding reference signal. For example, the reference signals are applied to the terminals 100, 102, 104 and 106. Specifically, the terminal 100 may receive a reference signal having nominally a zero phase; terminal 102 may receive a reference signal 90° out of phase with the reference signal applied to the terminal 100; terminal 104 may receive a signal 180° out of phase with that applied to the terminal 100, and finally terminal 106 may receive the reference signal which is 270° out of phase from the signal applied to terminal 100.

Each section of the digital filter includes a plurality of diodes. For example, each section may have a diode 108, a diode 110, a diode 112 and a diode 114. These diodes essentially operate as a switch to pass the reference signal at desired times. Each section of the digital filter also includes a transistor 116 which is coupled from the group of four diodes. Additionally, a capacitor 118 is included with each of the sections of the digital filter. The line signal which is the input signal from the signal source 52 shown in FIG. 1 is applied to terminals 120 and 122. If the line signal is AM modulated, the terminals 120 and 122 may be connected together since the AM-modulated signal contains both plus and minus values which are necessary to the operation of the digital filter. If the signal from the signal source 52 is FM modulated, then it is necessary to invert the signal from the signal source 52 and to feed the inverted and regular signals separately to the terminals 120 and 122.

Assuming, however, that the input signal is AM modulated, as indicated above, the terminals 120 and 122 would be connected together. The signal from the signal source 52 is applied to the diodes through the use of resistors 124 and 126. The resistors 126 have a slightly lower value than the resistors 124. The transistors 116 are normally at cutoff and normally do not provide for an output signal. The four-phase reference signals as indicated above are applied to the digital filter through the terminals 100 through 106. When a line signal is present at terminals 120 and 122, in representation of a signal from the signal source 52 shown in FIG. 1, which signal is either a start or stop signal, and if the four-phase reference source has the same frequency as the line signal, then the line signal will be correlated at different times with the four-phase reference signal applied to the terminals 100 through 106.

Assuming first that the line signal is correlated with one of the diodes 108 and assuming that both the line signal and the reference signal applied to one of the terminals 100 through 106 are both positive, one of the diodes 108 will allow one of the capacitors 118 to charge. When the line input is negative, and when the reference signal applied to the one of the terminals 100 through 106 is also negative, then the capacitor 118 is allowed to discharge. The capacitors 118 are alternately charged and discharged in succession in accordance with the correlation of the four-phase reference signal applied to the terminals 100 through 106 and the line signal applied to the terminals 120 and 122. The charging and discharging of the capacitors 118 also controls the transistors 116 in succession and which transistors are normally at cutoff but which go to saturation when there is a correlation between the signals. The output signal at the emitters of the transistors 116 are, therefore, at a constant level when there is correlation.

The output signal from the digital filter which appears at the common terminal of the emitters of all the transistors 116, therefore, occurs only when there is an accurate correlation between the reference signal and the line signal. The output signal of the digital filter controls a transistor 128 which is normally at saturation and which goes to cutoff in the presence of an output signal from the digital filter. The transistor 128 is included in a circuit with a unijunction transistor 130. The unijunction transistor also includes resistors 132, 134, 136 and 138 plus a capacitor 140. The unijunction transistor 130 in association with the resistors 132 through 138 and the capacitor 140 provide an output signal when the transistor 128 goes from saturation to cutoff. The output signal from the unijunction transistor is applied to a bistable flip-flop through the capacitor 140.

The bistable flip-flop includes transistors 142, 144 with associated resistors, capacitors and diodes, such as resistors 146, 148, 150, 152, 154, 156 and 158, capacitors 160 and 162, and diodes 164 and 166. The output from the bistable flip-flop is at terminals 168 and 170. The terminal 168, for example, may receive an output in accordance with the state of the flip-flop, which state represents that a stop signal has been received by the signal source 52 of FIG. 1. The terminal 170 may receive an output in accordance with the state of the flip-flop, which state represents that a start signal has been received by the signal source 52 of FIG. 1. The bistable flip-flop including the transistors 142 and 144 is therefore triggered to one of two states to produce the desired output signals.

When the digiral filter receives an input signal at the terminals 120 and 122 which is correlated with the four-phase reference signal, the digital filter ultimately controls the bistable flip-flop to be in the desired state. As indicated above, the outputs from the bistable flip-flop also control the frequency of the reference signal applied to the digital filter so that the total system not only controls the on and off of the facsimile system but also controls the reference signal applied to the digital filter to be at the proper frequency.

Although the invention has been described with reference to a particular embodiment, it is to be appreciated that various adaptations and modifications may be made and the invention is only to be limited by the appended claims.

We claim:

1. A facsimile recording system for producing a facsimile from information in an input signal, and with the input signal including a first signal having a first frequency immediately prior to the information and with the input signal including a second signal having a second frequency immediately subsequent to the information, including first facsimile means to produce an output facsimile in accordance with the information in the input signal, second means coupled to the first means and with the second means having two states and with the second means in the first state controlling the first means to be on and with the second means in the second state controlling the first means to be off, third means including a digital filter coupled to the second means for controlling the state of the second means and with the digital filter responsive to the first and second signals in the input signal to control the second means to be in the first state when the digital filter is responsive to the first signal and to control the second means to be in the second state when the digital filter is responsive to the second signal and wherein the third means in addition to controlling the state of the second means also controls the responsiveness of the third means to the first or second signals.

2. The facsimile recording system of claim 1 wherein the first means includes a precision oscillator to regulate the operation of the first means and wherein the digital filter is responsive to and correlates the first and second signals with a reference signal produced from the output of the precision oscillator.

3. A facsimile system for use in reproducing an input signal containing a start signal of a first frequency, an information signal and a stop signal of a second frequency, including, first means for producing a reference signal having first and second frequency values substantially equal to the frequencies of the start and stop signals, filter means responsive to the reference signal and to the start and stop signals for producing a first output signal to control the facsimile system to be on when the frequency of the reference signal is substantially the same as the frequency of the start signal and for producing a second output signal to control the facsimile system to be off when the frequency of the reference signal is substantially the same as the frequency of the stop signal, second means coupled to the first means for controlling the first means to produce either the first or second frequency value, and third means coupling the output of the filter means to the second means to have the second means control the first means to produce the second frequency value when the filter means produces the first output signal and to have the second means control the first means to produce the first frequency value when the filter means produces the second output signal.

4. The facsimile system of claim 3 wherein the filter means includes a digital filter for correlating the reference signal with the start and stop signals.

5. The facsimile system of claim 3 wherein the filter means includes a digital filter and wherein the first means produces a four-phase reference signal.

6. The facsimile system of claim 3 wherein the facsimile system includes a precision oscillator to regulate the operation of the facsimile system and wherein the reference signal is derived from the output of the precision oscillator.

7. An automatic on-off control for a facsimile system of the type including a precision oscillator wherein the facsimile system produces a facsimile from information included in an input signal and wherein the input signal includes a start signal of a first frequency prior to the information and a stop signal of a second frequency subsequent to the information, including first means responsive to the output from the precision oscillator for producing a first frequency signal, second means responsive to the output from the precision oscillator for producing a second frequency signal, switch means coupled to the first and second means for producing as an output signal either the first or second frequency signal in accordance with the operation of the switch means, third means coupled to the switch means and responsive to the output signal from the switch means for producing a reference signal having a frequency in accordance with the frequency of the output signal and with the frequencies of the reference signal corresponding to the frequencies of the start and stop signal in the input signal, and fourth means coupled to the switch means, the third means and the facsimile system and responsive to the start and stop signals and to the reference signal and with the first means producing a first output signal to start the facsimile system and operate the switch means to produce as an output signal the second frequency signal when the fourth means receives the start signal and the reference signal corresponding to the start signal and with the fourth means producing a second output signal to stop the facsimile system and operate the switch means to produce as an output signal the first frequency signal when the fourth means receives the stop signal and the reference signal corresponding to the stop signal.

8. The automatic on-off control of claim 7 wherein the fourth means includes a digital filter.

9. The automatic on-off control of claim 7 wherein the fourth means includes a digital filter in combination with a bistable flip-flop.

10. The automatic on-off control of claim 7 wherein the fourth means includes a digital filter and wherein the third means produces a four-phase reference signal for application to the digital filter.

11. A facsimile system responsive to an external signal and with the external signal including a start signal of a first frequency, an information signal and a stop signal of a second frequency, including first means for producing first and second reference signals having frequencies corresponding to the frequencies of the start and stop signal in the external signal and with the first means including switching means for controlling the output of the first means to be either the first or second reference signal, second means responsive to the output from the first means and to the external signal for producing an output from the second means when the frequency of the output signal from the first means is correlated to the frequency of the external signal, third means having first and second states and responsive to the output from the second means for switching the third means between the first and second states upon receiving the output from the second means and with the third means in the first state controlling the facsimile system to be started and to produce a facsimile from the information signal and to control the switching means in the first means to provide as the output from the first means the second reference signal having the frequency corresponding to the stop signal and with the third means in the second state controlling the facsimile system to be stopped and to control the switching means in the first means to provide as the output from the first means the first frequency signal being the frequency corresponding to the start signal.

12. The facsimile system of claim 11 wherein the second means includes a digital filter.

13. The facsimile system of claim 11 wherein the facsimile system includes a precision oscillator for use in regulating the operation of the facsimile system and wherein the first means is responsive to the output from the precision oscillator to produce the first and second reference signals.

* * * * *